B. W. OLSON.
AUTOMOBILE BRAKE.
APPLICATION FILED OCT 28, 1919.
1,339,524.
Patented May 11, 1920.
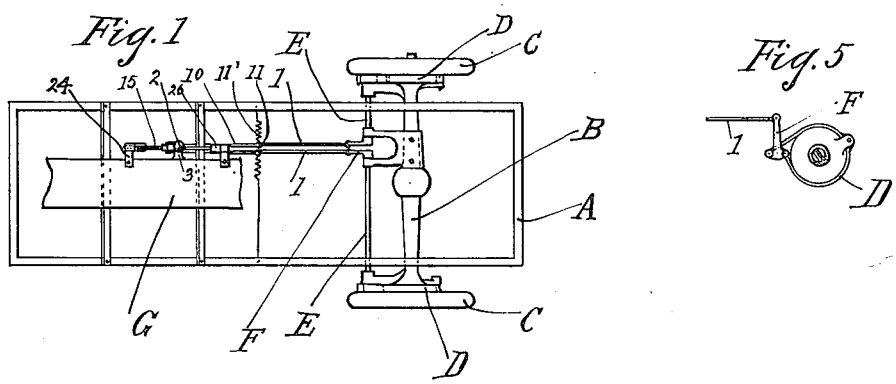
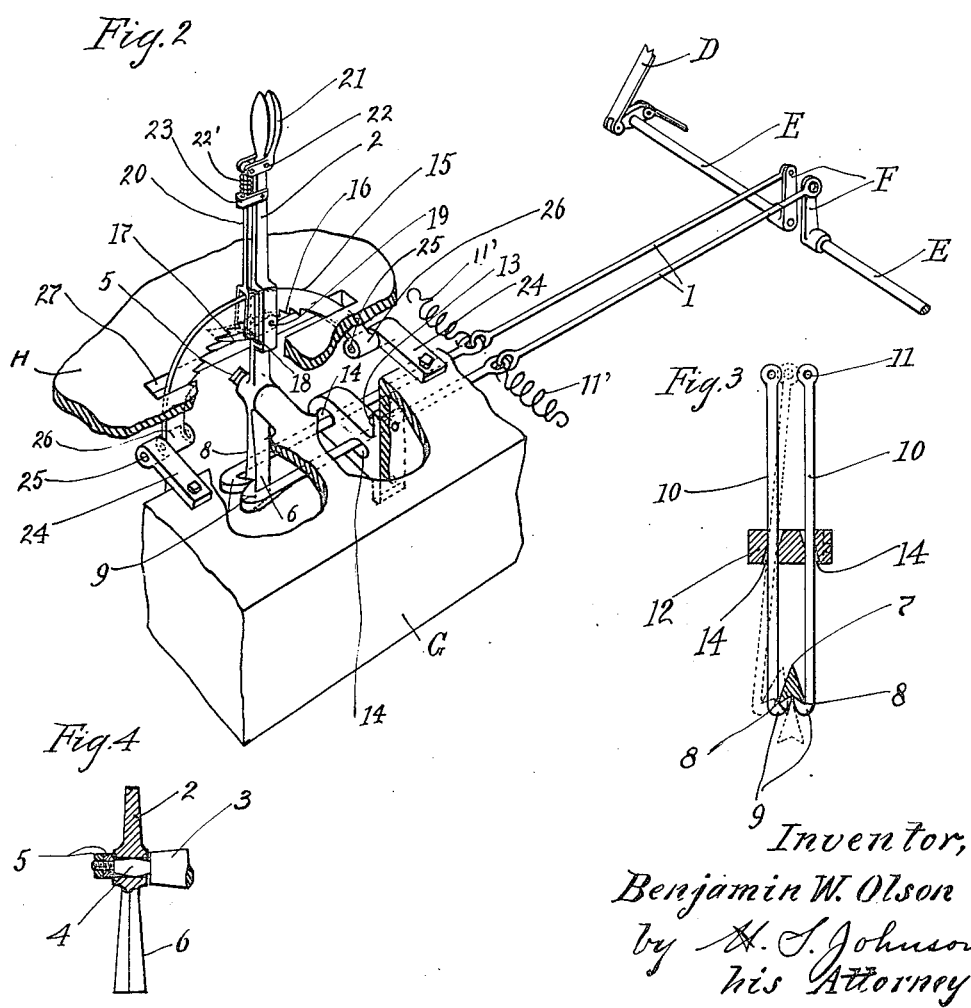
Inventor,
Benjamin W. Olson
by H. S. Johnson
his Attorney

UNITED STATES PATENT OFFICE.

BENJAMIN W. OLSON, OF STILLWATER, MINNESOTA.

AUTOMOBILE-BRAKE.

1,339,524.   Specification of Letters Patent.   Patented May 11, 1920.

Application filed October 28, 1919. Serial No. 333,953.

*To all whom it may concern:*

Be it known that I, BENJAMIN W. OLSON, a citizen of the United States, residing at Stillwater, in the county of Washington and State of Minnesota, have invented certain new and useful Improvements in Automobile-Brakes, of which the following is a specification.

This invention relates to automobile brakes and has for its object to provide improved means of simple construction for arbitrarily applying brake action on either of the driving wheels.

A further object of the invention is to provide means for locking either of the wheels against movement, so that when in the course of travel a soft spot in the road is met with, the wheel remaining on the solid ground may be operated alone so as to receive the full power of the engine, the other wheel being held locked and thereby preventing the latter from digging deeper into the road. With this and other objects hereinafter pointed out the invention consists in the construction, combination and arrangement of parts hereinafter described and claimed.

In the drawings:

Figure 1 is a diagrammatic plan view of a chassis showing the invention as applied to the driving wheels.

Fig. 2 is a fragmentary perspective view of the invention showing it applied to parts of the power mechanism supported on the chassis.

Fig. 3 is a top view of a detail partly in section.

Fig. 4 is a fragmentary sectional view of the operating lever, and

Fig. 5 is a side view of a band brake.

In the drawings A represents the frame of a chassis mounted on the rear axle casing B the latter rotatably supporting in any suitable manner the driving wheels C. The band brakes D are shown of ordinary construction and are operated respectively by the transverse shafts E, each shaft carrying rigidly a crank arm F pivotally connected with the rods 1.

G represents diagrammatically the gear case of an automobile supported on the frame A, the gear case as shown being located at the front end of the chassis adjacent the seat of the operator, not shown.

As shown the invention is preferably mounted on the gear case, and comprises an operating lever 2 normally in upright position and pivotally supported as shown on a hub 3 by means of a pivot pin 4, the latter having threaded thereon a pair of nuts 5 to hold the lever positioned. The bearing portion of the pin 4 is somewhat larger in diameter midway between its ends and is some what longer than the width of the bearing surface of the lever 2, the bore in the latter being of uniform diameter and rotatably fitting over said pin. Thus, the lever may be rotated around the pivot pin 4 and simultaneously rocked laterally. The pivot pin 4 serves as a fulcrum for the lever, the lever extending downwardly therefrom. The extended portion 6 of the lever is formed triangular in cross section as shown in Fig. 3, the apex of the triangle forming a rearwardly directed knife edge 7 at the lower end of the lever; the forward face of the lever below the fulcrum being formed with a longitudinal groove whereby are formed two forwardly directed acutely angled edges 8 adapted to fit the angle of the hook ends 9 of a pair of pull rods 10 formed at their respective rearward ends with eyes 11. The pull rods 10 are slidingly supported in a laterally extending lug 12 shown in the construction set forth supported on the gear box G by means of bolts 13. The rods are normally in parallel relation and oppositely disposed in horizontal plane, and are projected through openings 14 piercing the lug 12, wherein the rods are adapted to be slid loosely back and forth.

The openings 14 are formed circular in cross section midway between their ends and flare interiorly outwardly to form elliptical openings on opposite faces of the lug 12. The openings are so flared interiorly (Fig. 3) that the rods may be operated at their hook ends to move either one of them individually laterally away from the other by the lever 2 when it is caused to be rocked either to the right or left. When the lever is simultaneously rocked laterally and rotated about the pivot 4 either of said pull rods 10 may be arbitrarily engaged by the extension 6 to be drawn forwardly. A pair of retaining springs 11' are connected respectively with the eyes 11 of said rods and are suitably anchored in the frame of the chassis in a manner to keep the rods in normal parallel position, as indicated in Fig. 1. The rods are pivotally connected to the eyes 11 of the rods 1 which as hereinbefore described operate the shafts E and in turn actuate the band brake. Thus, each of the pull-rods 10 joined to the rod 1 forms as a whole what may be termed a laterally bendable brake operating rod restrained against bending by a spring. Thus, when the lever 2 is actuated it may be vibrated to the right or left and rotated around its fulcrum 4 to apply brake action on either of the driving wheels as desired. For the purpose of holding the brake in gripping position a swinging toothed segment 15 is so mounted as to swing in a transverse plane around an axis longitudinally disposed with respect to the chassis, said axis intersecting the axis of rotation of the lever in its lateral movement.

The arc of the segment is concentric with the pivot 4, the teeth 16 thereon being inclined rearwardly and adapted to engage the pawl 17 which latter operates in a vertically disposed slot 18 in the lever 2, the pawl being pivoted by means of a transverse pivot pin 19 in said lever.

The segment 15 is projected through the slot 18 so as to be carried with the lever when the latter is rocked sidewise. The pawl 17 has further pivotal connection with an operating rod 20 the latter having pivotal connection with a bell crank handle 21 pivoted by means of pin 22 in the top of the lever 2.

A coil spring 22' surrounding the sliding rod 20 and abutting against the bell crank 21 and an abutment 23 rigid on the lever, serves to constantly urge the pawl against the teeth of the segment.

The pivotal mounting of the segment 15 comprises a pair of hangers 24 supported on a part of the chassis and are shown in the drawings supported on the gear casing, a pair of pivot pins 25 in the ends of said brackets and extending through the hubs 26 at the respective ends of said segment wherein said pins are journaled. As shown in the drawings the segment 15 is projected upwardly through a slot 27 in the floor H of the car body, the slot being sufficiently wide to permit the lever to be rocked laterally.

I claim:

The combination with a vehicle having a differential drive, and independent brakes coöperating with the two traction wheels, of a rock shaft for each brake yieldingly held in normal position and having an arm, a loosely fulcrumed lever the short arm thereof extending upwardly, locking means for said lever, an independent rod-like connection for each of said rock shaft arms said connections extending forwardly to engage said short arm, and being slightly spaced from one another so as to loosely receive the lower end of said short arm between them to form a guide for the latter when said lever is actuated, each of said rod-like connections being formed at its forward extremity with an inturned comparatively shallow shoulder to be engaged by the short arm of said lever to operate said brake when it is moved through its forward stroke, said rod-like connection being mounted so as to be movable under stress laterally at their shoulder ends, and said lever being fulcrumed so as to render the short arm thereof movable in a diagonal forward direction during a continuous stroke for the purpose set forth.

In testimony whereof I affix my signature.

BENJAMIN W. OLSON.